US008831883B2

(12) United States Patent
Breisinger et al.

(10) Patent No.: US 8,831,883 B2
(45) Date of Patent: Sep. 9, 2014

(54) METHOD FOR OUTPUTTING NAVIGATION INSTRUCTIONS

(71) Applicant: Bayerische Motoren Werke Aktiengesellschaft, Munich (DE)

(72) Inventors: Marc Breisinger, San Francisco, CA (US); Josef Schumann, Munich (DE); Robertus Mariet, Sunnyvale, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 13/896,471

(22) Filed: May 17, 2013

(65) Prior Publication Data

US 2013/0253830 A1   Sep. 26, 2013

Related U.S. Application Data

(63) Continuation of application No. PCT/EP2011/070476, filed on Nov. 18, 2011.

(30) Foreign Application Priority Data

Nov. 19, 2010   (DE) .......................... 10 2010 052 000

(51) Int. Cl.
*G01C 21/36*   (2006.01)
*G01C 21/00*   (2006.01)

(52) U.S. Cl.
CPC .............. *G01C 21/00* (2013.01); *G01C 21/365* (2013.01); *G01C 21/3632* (2013.01); *G01C 21/3658* (2013.01)
USPC ........... 701/533; 701/426; 701/418; 340/992; 340/995.11; 340/995.15; 340/995.17; 340/995.2; 340/995.27; 340/995.14

(58) Field of Classification Search
CPC .. G01C 21/00; G01C 21/365; G01C 21/3632; G01C 21/3658
USPC .................. 701/201, 533, 418, 426; 340/992, 340/995.11, 995.15, 995.17, 995.2, 995.27, 340/995.14
See application file for complete search history.

(56) References Cited

U.S. PATENT DOCUMENTS 5,874,905 A * 2/1999 Nanba et al. ................ 340/995.2
5,926,118 A * 7/1999 Hayashida et al. ...... 340/995.21
(Continued)

FOREIGN PATENT DOCUMENTS

DE   100 39 687 A1   2/2002
EP   1 942 314 A1   7/2008
(Continued)

OTHER PUBLICATIONS

International Preliminary Report on Patentability (PCT/IB/338 & PCT/IB/373), including Written Opinion (PCT/ISA/237) dated May 30, 2013 (nine (9) pages).
(Continued)

*Primary Examiner* — Calvin Cheung
*Assistant Examiner* — Angelina Shudy
(74) *Attorney, Agent, or Firm* — Crowell & Moring LLP

(57) ABSTRACT

A method is provided for outputting navigation instructions in a motor vehicle having a navigation system and a head-up display. Graphical navigation instructions are output in at least three instruction categories which differ substantially in terms of the graphical level of detail of the particular navigation instruction, the instruction category being selected based on the distance between the motor vehicle and an action point for the navigation maneuver. Navigation instructions in the category for short distances include a perspective lane-exact representation of a map section relevant to the navigation maneuver in the head-up display, a first driving line which is proposed by the navigation system is depicted in the map section in a lane-exact manner by way of a first graphical line object and an alternative second driving line is also depicted in a lane-exact manner by way of a second graphical line object differing from the first line object.

11 Claims, 2 Drawing Sheets

(56) References Cited

U.S. PATENT DOCUMENTS

| | | | |
|---|---|---|---|
| 7,874,689 B2* | 1/2011 | Tane et al. | 362/23 |
| 2002/0053984 A1* | 5/2002 | Yamashita et al. | 340/988 |
| 2005/0154505 A1* | 7/2005 | Nakamura et al. | 701/1 |
| 2008/0114534 A1* | 5/2008 | Yamazaki et al. | 701/201 |
| 2009/0132162 A1 | 5/2009 | Kudoh et al. | |
| 2009/0177388 A1 | 7/2009 | Schmidt | |
| 2009/0240426 A1 | 9/2009 | Akita et al. | |
| 2009/0306852 A1 | 12/2009 | Ikeda et al. | |
| 2010/0131190 A1* | 5/2010 | Terauchi et al. | 701/201 |
| 2010/0153000 A1* | 6/2010 | Akita et al. | 701/201 |
| 2011/0109475 A1* | 5/2011 | Basnayake et al. | 340/902 |
| 2011/0288766 A1* | 11/2011 | Nagasawa et al. | 701/201 |
| 2012/0249589 A1* | 10/2012 | Gassner et al. | 345/633 |
| 2013/0009759 A1* | 1/2013 | Kinoshita et al. | 340/425.5 |
| 2013/0218453 A1* | 8/2013 | Geelen | 701/410 |

FOREIGN PATENT DOCUMENTS

| | | |
|---|---|---|
| EP | 2 078 927 A2 | 7/2009 |
| WO | WO 2009/119944 A1 | 10/2009 |

OTHER PUBLICATIONS

R. Lind et al., "The Network Vehicle—A Glimpse into the Future of Mobile Multi-Media", IEEE AES Systems Magazine, Sep. 1999, pp. 27-32, vol. 14, No. 9, XP-000941847 (Six (6) pages).

International Search Report dated Feb. 13, 2012 including English-language translation (Six (6) pages).

German Search Report dated Oct. 24, 2011 including partial English-language translation (Ten (10) pages).

* cited by examiner

METHOD FOR OUTPUTTING NAVIGATION INSTRUCTIONS

CROSS REFERENCE TO RELATED APPLICATIONS

This application is a continuation of PCT International Application No. PCT/EP2011/070476, filed Nov. 18, 2011, which claims priority under 35 U.S.C. §119 from German Patent Application No. DE 10 2010 052 000.4, filed Nov. 19, 2010, the entire disclosures of which are herein expressly incorporated by reference.

BACKGROUND AND SUMMARY OF THE INVENTION

The invention relates to a method for outputting navigation instructions in a motor vehicle which has a navigation system and a head-up display device suitable for outputting graphical navigation information.

It is known from the state of the art to output navigation instructions in several graphically differently designed steps. It is also known from the state of the art to output driving lane information. However, depending on the embodiment, some of the known display types are still not difficult to be intuitively understood by the respective operator.

Head-up display devices, by which graphical information can be projected by way of the windshield into the driver's field of vision, have in the meantime become increasingly available in modern motor vehicles.

It is an object of the invention to provide a simple method for outputting easily comprehensible navigation instructions to the driver of a motor vehicle.

This and other objects are achieved by a method according to the invention, in which graphical navigation instructions are output in at least three instruction categories, which categories differ significantly with respect to the extent of graphical details of the respective navigation instruction. Which instruction category is selected for the output of a navigation instruction to be output is at least a function of the distance of the motor vehicle to an action point of the navigation maneuver announced by the navigation instruction, possibly the traveled road type. The following applies, for example, to highways when three categories are used: Instruction category 1 on the last 400 meters before the action point of the announced turn-off maneuver; instruction category 2 in the case of distances to the action point between 2,000 meters and 400 meters; instruction category 3 in the case of distances to the action point of more than 2,000 meters.

Navigation instructions of that instruction category (in the following called the first instruction category), which is selected for short distances (in the above example, on highways, thus a distance of less than 400 meters from the action point) comprise a perspective lane-exact display of a map section relevant to the navigation maneuver in the head-up display device. In the head-up display device, a first driving line proposed by the navigation system is depicted in the map section in a lane-exact manner by way of a first graphical line object (i.e. in the shape of a first graphical line object). In addition, a second driving line proposed by the navigation system as an alternative is depicted in the map section in a lane-exact manner by a second graphical line object, which differs from the first line object at least with respect to its graphical object fill. The action point is graphically marked in the map section by an action point marker arranged along the first line object. The current distance between the motor vehicle and the action point is graphically marked in the map section by way of a distance marker arranged along the first line object in line with position changes of the motor vehicle.

The graphical navigation instructions of the first instruction category thereby provide the driver in a simple and low-diversion manner with an easily interpretable information spectrum that is clearly improved in comparison to the state of the art.

The distance marker for marking the current distance between the motor vehicle and the action point can be generated particularly advantageously in that, below the action point marker, the first line object has a first area essentially adjacent to the action point marker and having a first graphical object fill, that it further has a second area adjacent to this first area, which second area extends to the lower end of the line object and has a second graphical object fill, and that the boundary between the first area and the second area is displaced with an increasing distance in the direction of the action point marker. In other words, the distance marker for marking the current distance between the motor vehicle and the action point consists of the fact that, at the location of the first line object, which corresponds to the current position of the motor vehicle, a transition takes place from a first graphical object fill of the first line object to a second graphical object fill of the first line object. In this manner, a display form, which is known from the state of the art, is elegantly modified as a separate distance bar which "gradually erases itself" as the distance decreases and is taken over into the overall display on the basis of the perspective road map.

According to a preferred embodiment of the present invention, even navigation instructions of a second instruction category, which is selected for medium distances, contain lane information. The latter information is visualized by a graphical display of the driving lanes available in the current position of the motor vehicle in its current driving direction. This graphical display is kept in an extreme landscape format, essentially constructed as a horizontal strip, and is arranged at the lower edge of the display surface of the head-up display device. The landscape format and the arrangement at the lower edge ensure that the driver will not already be substantially distracted from the traffic situation by this display. He can nevertheless already obtain and follow driving lane instructions. In the case of navigation instructions of the second instruction category, the action point is still relatively far away, which is why the graphical display of the lanes in the second instruction category still ends before the action point.

According to a particularly preferred embodiment of the present invention, that is based on this embodiment, the graphical display of the driving lanes is taken over from the second instruction category as part of the map section into the first instruction category (which is selected for short distances), when, because of a reduction of the distance between the motor vehicle and the action point, a transition takes place from the second instruction category to the first instruction category. Therefore, when, during the display of the navigation instruction of the second instruction category, the driver's view is fixed on the driving lane information strip shown in the landscape format, he can continue to focus on the latter during the transition to the display of the navigation instruction of the first instruction category because the driving lane information strip is taken over into the latter. For this purpose, the driving lane information strip visible in the second instruction category should naturally already be constructed in a graphically particularly suitable manner. It should particularly have a suitable size and provide a suitable perspective display of the driving lanes.

In other words, the navigation instruction of the second instruction category should already contain a section—having a landscape format and limited to an area ahead of the action point—of the map section which subsequently is to be displayed perspectively within the scope of the navigation instruction of the first instruction category.

Again in other words, the map section displayed within the scope of the navigation instruction of the first instruction category graphically "develops" from the driving lane information strip previously displayed within the scope of the navigation instruction of the second instruction category.

The above-mentioned particularly preferred embodiment of the present invention can advantageously be further developed such that the driving lane information of the second instruction category contains driving lane indication objects which had already been advantageously adapted to the display of the first instruction category. In particular, the graphical display of the driving lanes in the second instruction category can be graphically enriched by use of a first driving lane indication object which marks that driving lane on which the first driving line extends that is proposed by the navigation system as well as by use of second driving lane indication object which marks that driving lane on which the second driving line extends that was proposed by the navigation system, in which the second driving lane indication object differs from the first driving lane indication object at least with respect to its graphical object fill. The first driving lane indication object can be replaced by the first line object when, because of a reduction of the distance between the motor vehicle and the action point, a transition takes place from the second instruction category to the first instruction category, and the second driving lane indication object can be replaced by the second line object when, because of a reduction of the distance between the motor vehicle and the action point, a transition takes place from the second instruction category to the first instruction category.

A particularly clear graphical "development" of the map section displayed within the scope of the navigation instruction of the first instruction category from the driving lane information strip previously displayed within the scope of the navigation instruction of the second instruction category is achieved in that the graphical object fill of the first line object corresponds essentially to that of the first driving lane indication object, and in that the graphical object fill of the second line object corresponds essentially to that of the second driving lane indication object. The driver observing the transition will be able to assign mutually corresponding information without any problem.

According to a preferred embodiment of the present invention, the navigation instructions of a third instruction category, which is selected for large distances, contain no driving lane information. It appears to be particularly advantageous to not even output such navigation instructions by way of the head-up display device but by way of a second display unit suitable for the output of graphical navigation instructions. In particular, such navigation instructions of the third instruction category can be output in the instrument cluster of the motor vehicle.

The description of the present invention is based on the fact that lane-accurate map data are present and that, therefore, lane-accurate driving lines can be computed and recommended by the navigation system, and that lane-accurate navigation instructions can be output. It is, however, not assumed in the present description that the position of the motor vehicle is known in a lane-exact manner. It is therefore assumed in the present description that the first and the second driving line proposed by the navigation system are computed independently of the currently traveled driving lane. However, the invention can equally be applied in a case in which the currently traveled driving lane of the motor vehicle is known, and the first and second driving lines are computed on this basis.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1b is a schematic view of a simultaneous graphical output in the instrument cluster of the motor vehicle with that of FIG. 1a;

FIG. 2b is a schematic view of a graphical output in the instrument cluster of the motor vehicle simultaneous with that of FIG. 2a;

FIG. 3b is a schematic view of a graphical output in the instrument cluster of the motor vehicle simultaneous with that of FIG. 3a;

FIG. 4b is a schematic view of a graphical output in the instrument cluster of the motor vehicle simultaneous with that of FIG. 4a.

DETAILED DESCRIPTION OF THE DRAWINGS

A motor vehicle includes a navigation system and a head-up display device suitable for the output of graphical navigation instructions. Graphical navigation instructions can also be output in the instrument cluster of the motor vehicle. The navigation instructions are output in three instruction categories which differ significantly from one another with respect to the extent of graphical details of the respective navigation instruction. In the present case, the instruction category for outputting a navigation instruction to be output depends on the distance between the motor vehicle and the action point of the respective navigation or turn-off maneuver and on the type of road. The dependence on the road type consists of the fact that the distance intervals are defined differently depending on the road type, for example, for highways as follows: Instruction category 1 on the last 400 meters; instruction category 2 in the case of distances between 2,000 meters and 400 meters; instruction category 3 in the case of distances of more than 2,000 meters.

The figure pairs FIG. 1a and FIG. 1b, FIG. 2a and FIG. 2b, FIG. 3a and FIG. 3b or FIG. 4a and FIG. 4b each provide a display example for the simultaneous display in the head-up display device and in the instrument cluster of the motor vehicle.

Figure 1B:
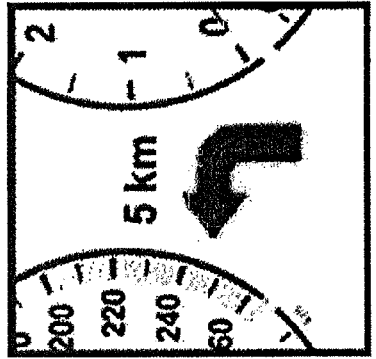
Figure 1A:
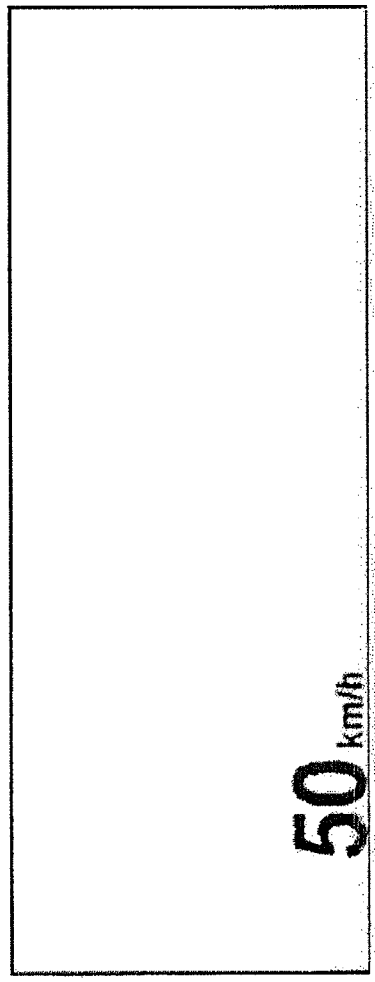
FIG. 1a is a schematic view of a graphical output of a head-up display device of a motor vehicle in the case of a long distance (5,000 meters) from the action point of a turn-off maneuver.

FIG. 1a and FIG. 1b provide a display example for a case in which the motor vehicle is still relatively far away from the next turn-off maneuver, here 5,000 meters. Corresponding to the above-indicated distance intervals, in this case, a navigation instruction of the third instruction category is output.

In the present example, navigation instructions of the third instruction category are output exclusively in the instrument cluster (compare FIG. 1b). In the head-up display device (compare FIG. 1a), no information is indicated except for the always present speed display, particularly no navigation instruction.

Figure 2B:
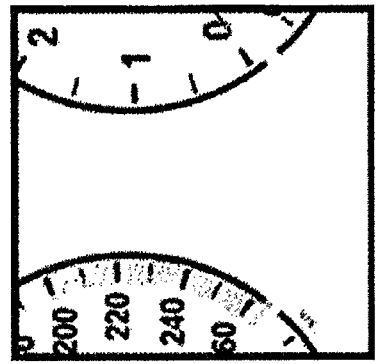
Figure 2A:
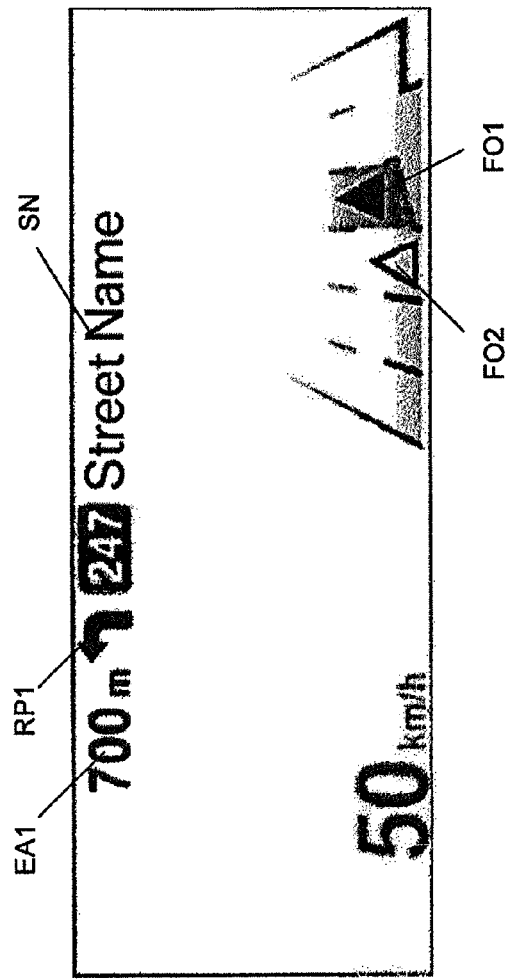
FIG. 2a is a schematic view of a graphical output of the head-up display device in the case of a medium distance (700 meters) from the action point.

FIG. 2a and FIG. 2b provide a display example for a case in which the motor vehicle is at a medium distance from the next turn-off maneuver, here 700 meters. Corresponding to the above-indicated distance intervals, in this case, a navigation instruction of the second instruction category is output.

The navigation instruction of the second instruction category output in the head-up display device (compare FIG. 2a) contains driving lane information. This information is designed as a horizontal strip at the lower edge of the display surface of the head-up display device. In this case, the driving lanes are shown which are available in the current position of the motor vehicle in its current traveling direction. However, the graphical display of the driving lanes ends in front of the action point; i.e. the action point is not shown in the image. The graphical display of the driving lanes in the second instruction category is graphically enriched by a first lane indication object FO1, which marks that driving lane on which a first driving line extends that is proposed by the navigation system, and by a second driving lane indication object FO2, which marks that driving lane on which a second driving line extends that is proposed as an alternative by the navigation system. The driving lane indication objects FO1 and FO2 are each designed as short arrows or triangles pointing in the traveling direction and have different graphical object fills.

In addition, a distance detail EA1 (700 meters) is displayed in the head-up display device, which distance detail indicates the remaining distance to the action point. Also displayed are a direction arrow RP1, which indicates the turn-off direction for the imminent turn-off maneuver, and an indication SN of a street name relevant to the turn-off maneuver, together with a street number.

No navigation instruction is simultaneously output in the instrument cluster (compare FIG. 2b).

Figure 3B:
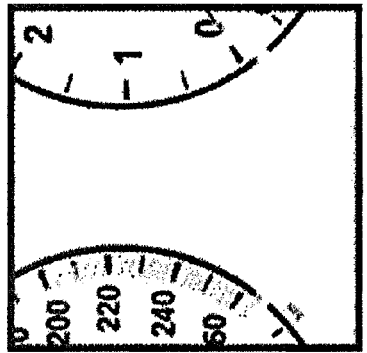
Figure 3A:
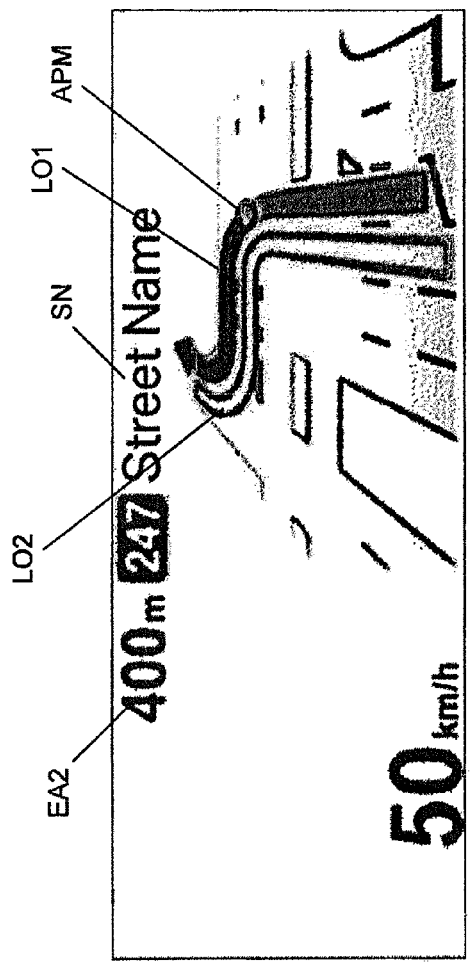
FIG. 3a is a schematic view of a graphical output of the head-up display device in the case of a short distance (400 meters) from the action point.

FIG. 3a and FIG. 3b indicate a display example for a case in which the motor vehicle is situated a short distance from the next turn-off maneuver, here 400 meters. Corresponding to the above-indicated distance intervals, a navigation instruction of the first instruction category is output in this case.

The navigation instruction of the first instruction category output in the head-up display device is displayed in FIG. 3a. It contains a perspective lane-accurate display of a map section relevant to the turn-off maneuver. The (above-mentioned) first driving line proposed by the navigation system is depicted in the map section in a lane-accurate manner in the shape of a first graphical line object LO1. The second driving line proposed by the navigation system is depicted in the shape of a second graphical line object LO2. LO1 and LO2 have different graphical object fills. The object fill of LO1 corresponds to that of FO1 of FIG. 2a; the object fill of LO2 corresponds to that of FO2 of FIG. 2a. The action point is graphically marked in the map section by an action point marker APM arranged along the first line object LO1.

The transition from a navigation instruction of the second instruction category according to FIG. 2a to a navigation instruction of the first instruction category according to FIG. 3a, which in the present case was triggered by a falling below the distance threshold of 400 meters to the action point, is characterized by the following essential graphical changes:

(a) "The driving lane information strip" displayed in FIG. 2a at the lower edge of the display surface of the head-up display device was essentially retained, but expanded to the map section which is displayed in FIG. 3a and which now also comprises the action point. The retaining of the driving lane information strip of FIG. 2a assumed that the latter had the suitable size and the suitable perspective already in FIG. 2a, i.e. within the scope of the navigation instruction of the second instruction category, in order to be able to be taken over in FIG. 3a, i.e. into the navigation instruction of the first instruction category.

(b) The first driving lane indication object FO1 was replaced by the first line object (LO1).

(c) The second driving lane indication object FO2 was replaced by the second line object LO2.

Furthermore, a numerical distance detail EA2 (400 meters), which indicates the remaining distance to the action point, as well as also the indication SN of the street name relevant to the turn-off maneuver, together with the street number, are displayed in the head-up display device. A direction arrow corresponding to RP1 of FIG. 2a is no longer displayed because the direction information is now depicted in the map section.

No navigation instruction is simultaneously output in the instrument cluster (compare FIG. 3b).

Figure 4B:
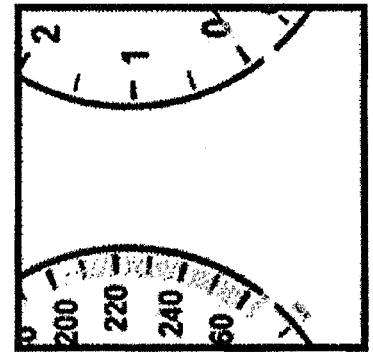
Figure 4A:
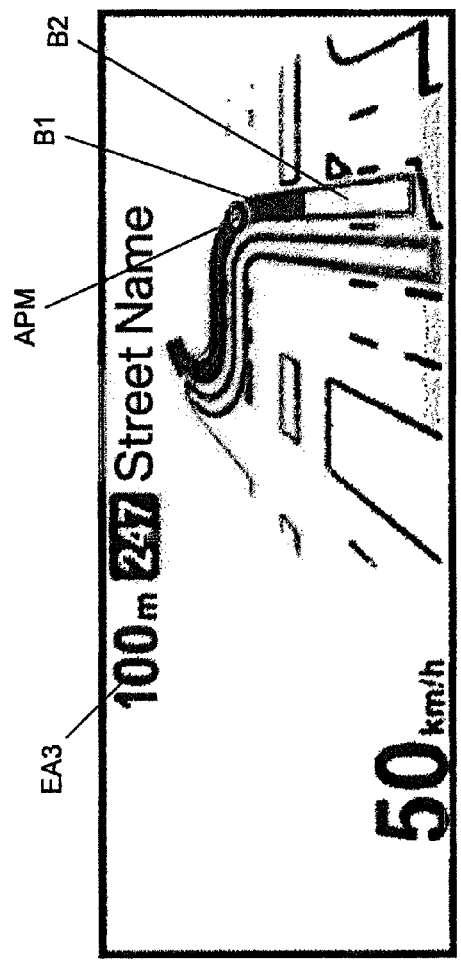
FIG. 4a is a schematic view of a graphical output of the head-up display device in the case of a still shorter distance (100 meters) from the action point.

FIG. 4a and FIG. 4b provide a display example for a case in which the motor vehicle is now at an even shorter distance from the next turn-off maneuver, here 100 meters. Corresponding to the above-indicated distance intervals, a navigation instruction of the first instruction category continues to be output in this case.

For the most part, the display according to FIG. 4a therefore corresponds to that of FIG. 3a. However, the navigation instruction of the first instruction category displayed in FIG. 4a is modified as follows in comparison to the one-shot display according to FIG. 3a. The distance to the action point is now reduced to 100 meters, which is indicated by a changed numerical distance detail EA3 (100 meters). However, in addition, the current distance of the motor vehicle from the action point is graphically marked in the map section, specifically by a distance marker arranged along the first line object LO1. In the current example, the distance marker is implemented as a boundary between graphically differently designed areas of the line object LO1 which is displaced in line with position changes of the motor vehicle between graphically differently constructed areas of the line object LO1. This applies to the two areas or sections of the first line object LO1, which are called B1 and B2 in FIG. 4a. Both areas are situated below the action point marker APM. B1 borders on the action point marker APM. B2 borders on B1 and extends from there to the lower end of the line object LO1. The boundary between the first area B1 and the second area B2 is displaced with decreasing distance of the motor vehicle from the action point in the direction of the action point maker; i.e. B2 expands as the distance decreases; B1 becomes shorter as the distance decreases and possibly finally disappears. In this manner, a display mode, which is known from the state of the art as a separate distance bar which "gradually erases itself" as the distance decreases, is elegantly modified and is taken over into the overall display on the basis of the perspective road map.

No navigation instruction is simultaneously output in the instrument cluster (compare FIG. 4b).

The method according to the invention differs from devices and methods of the state of the art at least with respect to the aspects explained in the following.

An advantageously changed information partitioning between the instrument cluster and the head-up display device is selected (navigation instructions partly in the instrument cluster, partly in the head-up display device).

An advantageous time-sequential display is selected which at first provides only a lane recommendation (second instruction category) and subsequently a navigation display (first instruction category) which develops from the lane recommendation.

The perspective type of display according to the invention creates a situational quasi-three-dimensional display (this is a display that is two-dimensional per se but perspective, which display can naturally take into account three-dimensional object shapes) of the lane recommendation and the navigation display in the head-up display device.

The perspective type of display according to the invention, in addition, permits a lane-related or lane-exact integration of the current position of the motor vehicle.

This results in the following achievements.

A comprehension of the lane recommendation information is improved in comparison to the state of the art because it is displayed in a more concrete manner than in the state of the art.

A display of the lane recommendation and of the navigation is appropriate for the situation (before the corresponding maneuver) and ("during" the concrete turn-off maneuver) respectively.

An increase in attention is provided with respect to the lane recommendation and the navigation display.

An elegant manner of outputting additional information of the current vehicle lane position in relationship to the recommended lane is provided.

A matching of the information with the outside world is improved in contrast to the state of the art, by way of the selected quasi-three-dimensional display.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for outputting navigation instructions in a motor vehicle which has a navigation system and a head-up display device suitable for outputting graphical navigation information, the method comprising the acts of:
   outputting, by the navigation system to the heads-up display, graphical navigation instructions in at least three instruction categories which differ with respect to an extent of graphical details of a respective navigation instruction;
   selecting, by the navigation system, the instruction category for the output of a navigation instruction to be output at least as a function of a distance of the motor vehicle to an action point of the navigation maneuver announced by the navigation instruction, wherein:
   navigation instructions of that instruction category, which is selected for short distances, comprise a perspective lane-exact display of a map section relevant to the navigation maneuver in the head-up display device,
   a first driving line proposed by the navigation system is depicted in the map section in a lane-exact manner by way of a first graphical line object,
   a second driving line proposed by the navigation system as an alternative is depicted in the map section in a lane-exact manner by a second graphical line object, which differs from the first line object at least with respect to its graphical object fill,
   the action point is graphically marked in the map section by an action point marker arranged along the first line object, and
   a current distance of the motor vehicle to the action point is graphically marked in the map section by way of a distance marker arranged along the first graphical line object, in line with position changes of the motor vehicle, wherein a position of the distance marker, within the first graphical line object, varies as a function of the distance of the motor vehicle to the action point of the navigation maneuver.

2. The method according to claim 1, wherein:
navigation instructions of a second instruction category, which is selected for medium distances, contain driving lane information which is visualized by a graphical display of driving lanes available in a current position of the motor vehicle in its current driving direction, which graphical display is arranged essentially as a horizontal strip at a lower edge of a display surface of the head-up display device, and
the graphical display of the driving lanes in the second instruction category ends in front of the action point.

3. The method according to claim 2, wherein:
the graphical display of the driving lanes is taken over from the second instruction category as part of the map section into a first instruction category, which is selected for short distances, when, because of a reduction of the distance between the motor vehicle and the action point, a transition takes place from the second instruction category to the first instruction category.

4. The method according to claim 3, wherein:
the graphical display of the driving lanes in the second instruction category is graphically enhanced by way of a first driving lane indication object which marks that driving lane on which the first driving line extends which is proposed by the navigation system,
the graphical display of the driving lanes in the second instruction category, in addition, is graphically enhanced by way of a second driving lane indication object, which marks that driving lane on which the second driving line extends that was proposed by the navigation system, and which second driving lane indication object differs from the first driving lane indication object at least with respect to its graphical object fill,
the first driving lane indication object is replaced by the first line object when, because of a reduction of the distance between the motor vehicle and the action point, a transition takes place from the second instruction category to the first instruction category, and
the second driving lane indication object is replaced by the second line object when, because of a reduction of the distance between the motor vehicle and the action point, a transition takes place from the second instruction category to the first instruction category.

5. The method according to claim 4, wherein:
the graphical object fill of the first line object corresponds essentially to that of the first driving lane indication object, and the graphical object fill of the second line object corresponds essentially to that of the second driving lane indication object.

6. The method according to claim 5, wherein:
navigation instructions of a third instruction category, which are selected for long distances, contain no driving lane information.

7. The method according to claim 2, wherein:
navigation instructions of a third instruction category, which are selected for long distances, contain no driving lane information.

8. The method according to claim 7, wherein:
the motor vehicle has at least a second display unit for the output of graphical navigation instructions, and
the navigation instructions of the third instruction category are output exclusively by the second display unit.

9. The method according to claim 8, wherein:
the navigation instructions of the third instruction category are output in the instrument cluster of the motor vehicle.

10. The method according to claim 1, wherein:
the instruction category that is selected for the output of a navigation instruction to be output is also selected as a function of a traveled type of road.

11. The method according to claim 1, wherein:
changes of the current distance of the motor vehicle from the action point are displayed within the scope of a navigation instruction of the first instruction category in that:
a) below the action point marker, the first line object has a first area with a first graphical object fill, which area essentially adjoins the action point marker, and a second area with a second graphical object fill, which second area is adjacent to the first area and extends to a lower end of the line object, and
b) a boundary between the first area and the second area is displaced in a direction of the action point marker as the distance decreases.

\* \* \* \* \*